United States Patent

Frystak et al.

[15] 3,644,033
[45] Feb. 22, 1972

[54] SLIDE MAGAZINE

[72] Inventors: Richard Frystak, Park Ridge; Irwin M. Gould, Skokie, both of Ill.

[73] Assignee: Bell & Howell Company, Chicago, Ill.

[22] Filed: Sept. 23, 1969

[21] Appl. No.: 860,856

[52] U.S. Cl. ...............................353/120, 206/62, 353/111
[51] Int. Cl. ..........................................................G03b 21/00
[58] Field of Search ..................................353/21, 103–113, 353/120; 206/62

[56] References Cited

UNITED STATES PATENTS 2,904,914  9/1959  Trubert..........................................40/78
3,002,426  10/1961  McCabe..........................................88/26
3,495,902  2/1970  Michniewicz..................................353/112

FOREIGN PATENTS OR APPLICATIONS 747,066  9/1944  Germany........................................88/28

*Primary Examiner*—Leonard Forman
*Assistant Examiner*—A. J. Mirabito
*Attorney*—William F. Pinsak

[57] ABSTRACT

A novel slide magazine especially adapted to present slides accurately to a slide projector in a horizontal plane and to provide a convenient storage device for photographic slides.

8 Claims, 6 Drawing Figures

PATENTED FEB 22 1972 3,644,033
SHEET 1 OF 2
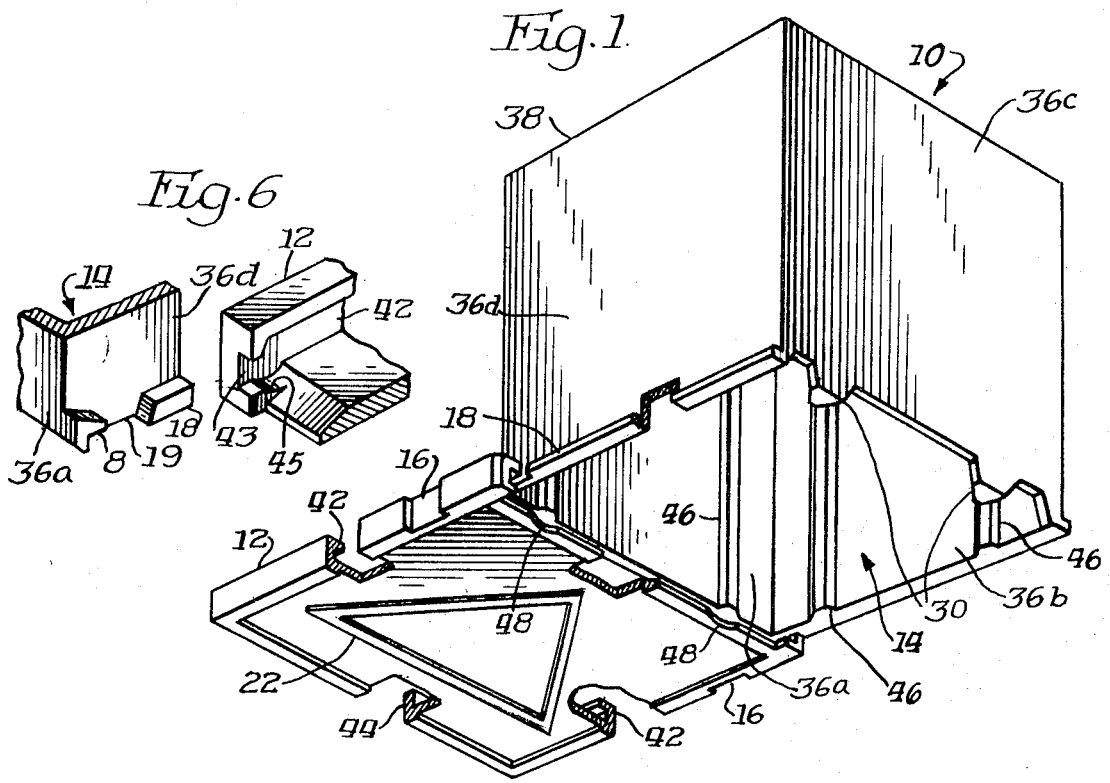
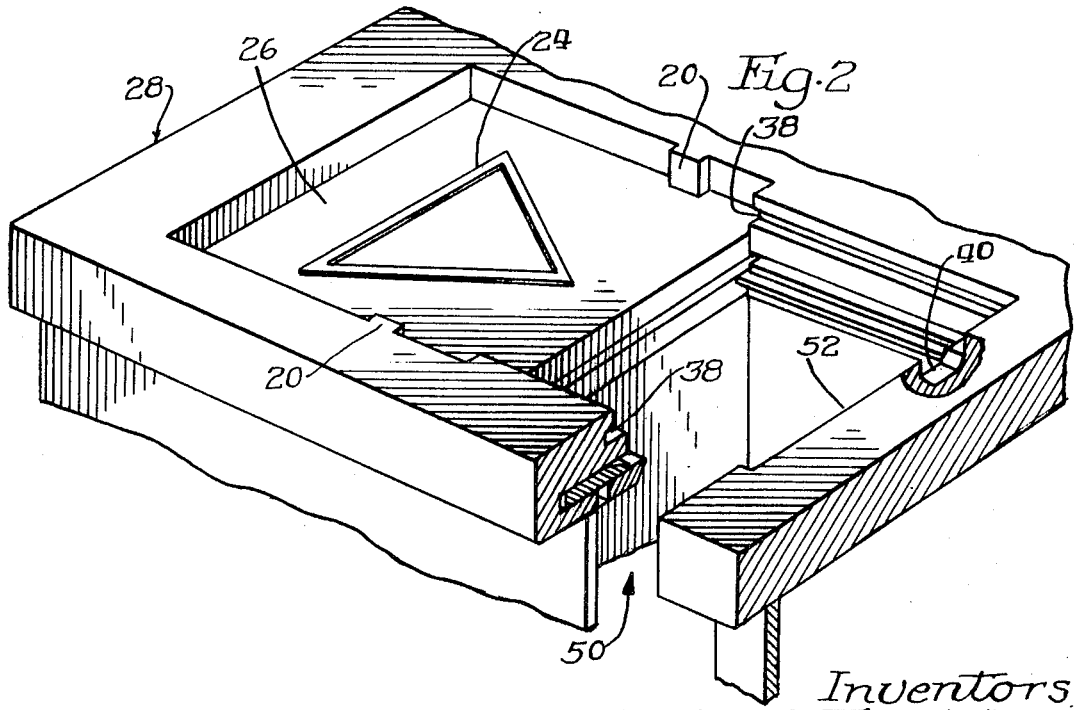
Inventors
Richard Frystak,
Irwin M. Gould.
By William F. Pinsak Atty.

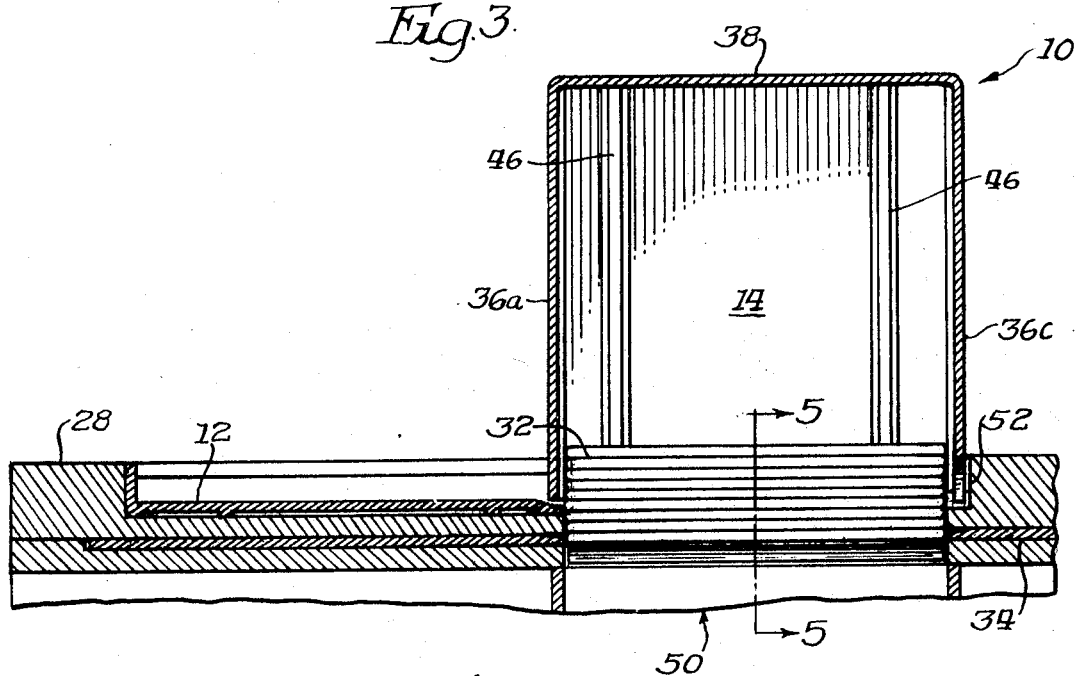
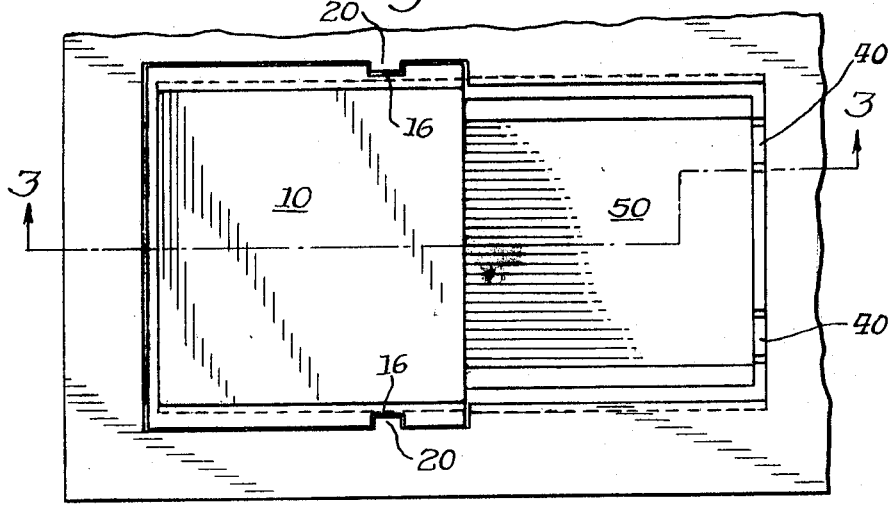
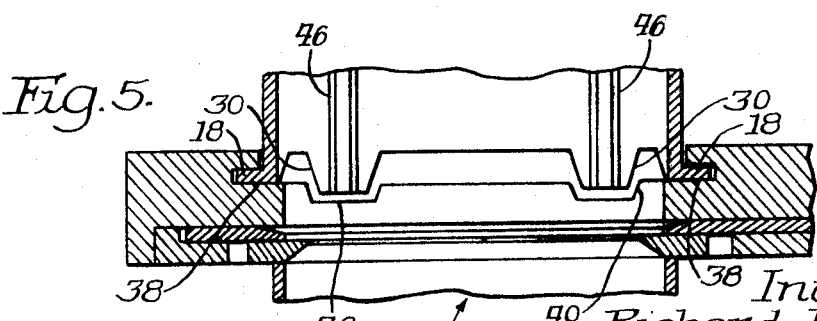

3,644,033

SLIDE MAGAZINE

CROSS-REFERENCE TO RELATED APPLICATIONS

This application is related to copending application Ser. Nos. 735,730, filed June 10, 1968; and 860,384, filed Sept. 23, 1970.

BACKGROUND OF THE INVENTION

This invention relates generally to the field of photographic storage magazines. To supply the type of projector described in the above-identified applications a storage magazine which would present the slides to the transport apparatus was necessary. Additionally, it was imperative to provide a magazine which presented the slides to a transport mechanism accurately and with precision. Furthermore a magazine which required proper orientation to be inserted into the projector was desired.

Since prior slide projectors have in general required entry of the slides in a vertical attitude, extensive treatment of the problems herein obviated has not appeared in the prior art.

SUMMARY OF THE INVENTION

The slide magazine to be described herein presents the stored slides to the slide projector in a horizontal plane. Furthermore this slide magazine has features which assure its accurate positioning relative to the slide projector and the accurate positioning of the slides relative to the transport mechanism of the slide projector.

BRIEF DESCRIPTION OF THE DRAWING

The features of the invention will become more apparent in the following description of a preferred embodiment and the drawings in which:

FIG. 1 is a perspective of the slide magazine.

FIG. 2 is a perspective of the magazine receiving portion of a slide projector.

FIG. 3 is a cross-sectional view of the magazine in operating relation with a slide projector.

FIG. 4 is a top view of the magazine in its initial position in a slide projector.

FIG. 5 is a cross-sectional view of a portion of the magazine in operational relationship with a slide projector.

FIG. 6 is an exploded view of a portion of FIG. 1 in which for purposes of clarity the cover has been rotated 180° from its normal assembled position.

DESCRIPTION OF THE PREFERRED EMBODIMENT

Referring to FIG. 1, the novel slide magazine 10 is seen in open condition and upside down orientation. Four upstanding sidewalls 36a, 36b, 36c, 36d, each of which is joined at its edge to an adjacent sidewall, and a bottom wall 38 joined to the sidewalls 36a, 36b, 36c, 36d define a slide storage chamber indicated generally at 14. As depicted, the storage chamber 14 is substantially cubic; the sidewalls 36a, 36b, 36c, 36d and the bottom wall 38 being substantially square with adjacent sidewalls normal to one another and the plane of the bottom wall 38 normal to the planes of the sidewalls 36a, 36b, 36c, 36d.

Although the sidewalls and bottom may be made of many materials, an added dimension of utility prevails when the construction material is transparent. Transparency allows an operation to visually determine the number of slides remaining and also their character if suitable markings, such as color, are added to the stored slides.

The shape of the bottom wall 38 depends on the shape of the slide to be contained in the chamber 14 and could easily be altered to accommodate other than square shaped slides. The shape of the sidewalls 36a, 36b, 36c, 36d is determined by the desired slide capacity of the chamber 14 which could be increased or decreased by changing the sidewalls 36a, 36b, 36c, 36d to an appropriate rectangular configuration.

Two flanges 18 protrude substantially perpendicularly from two parallel sidewalls 36b, 36d and extend along their upper edges from their junction with sidewall 36c to a point near their junction with sidewall 36a. As best seen in FIG. 6 an irregularly shaped post 8 projects normally from sidewall 36d substantially adjacent to the junction of sidewall 36d and sidewall 36a. Likewise, another identical post (not shown) extends from sidewall 36b substantially at its junction with sidewall 36a.

Two keying projections 30 extend from sidewall 36c beyond the plane of the upper surface of the flanges 18 on sidewalls 36b and 36d. A pair of inclined plane embossments 46 (FIG. 3) gradually increasing from the bottom of the chamber 14 to the top may be added to the sidewalls 36a, 36b, 36c, 36d to aid in the positioning of the stored slides when the slides reached the top of the chamber 14 as shown in FIGS. 1 and 5 embossments 46 may be formed on any or all of the sidewalls.

A generally square cover 12, with grooves 42 along two parallel edges which cooperate with the flanges 18 to permit relative slide movement between the cover 12 and the chamber 14, completes the magazine. A rim 44, protruding substantially perpendicularly from the cover 12 along a third edge thereof, prevents removal of the cover 12 by abutting sidewall 36a when the cover 12 is slid rightwardly into the closed position.

As seen in FIG. 6, the groove 42 formed in the cover 12 is constricted at 43, substantially adjacent the fourth edge of the cover 12. For purposes of clarity FIG. 6 has been depicted with the cover 12 rotated 180° from the position shown in FIG. 1. The constricted groove 43 will permit passage of the associated flange 18 but not the irregularly shaped post 8 because its height exceeds that of the flange 18. Thus the interaction of the constricted groove 43 and the irregularly shaped post 8 prevents removal of the cover 12 by sliding in a leftwardly direction. It should be noted that the configuration of the grooves 42 along both the edges of the cover 12 are substantially identical. The action of the posts 8, the rim 44 and the overlapping relationship of the grooves 42 with the flanges 18 prevent removal of the cover 12 from the storage chamber 14 in normal use. Substantially captive, the cover 12 ordinarily will not be misplaced, adding great convenience for the user.

The gap 19 between the flange 18 and the post 8 permits the cover 12, from the position in FIG. 1, to be rotated clockwise. In the position shown in FIG. 1, the post 8 is seated on surface 45 of the cover 12. The gap 19, wide enough to accommodate the portion of the cover 12 lying between surface 45 and the extreme rightward edge, allows passage of the cover 12 therethrough when the cover 12 is rotated clockwise about the post 8. Such a rotation completely opens the storage chamber 14, thereby facilitating removal of any slides stored therein.

Two indents 48 formed in the fourth edge of the cover correspond to the keying projections 30 which nestle in the indents 48 when the cover is in closed relationship with the chamber 14. Keying cutouts 16 on the grooved edges of the cover serve to ensure proper placement into the projection apparatus. An embossed triangle 22 on the top of the cover 12 aids in orienting the magazine 10.

To better understand the use of the magazine 10 reference is made to FIG. 2 wherein the magazine receiving portion of the slide projector is illustrated. A depression 26 in the projector housing 28 is shaped to accommodate the magazine 10 with the cover 12 closed. An embossed triangle 24 corresponding to the triangle 22 on the cover 12 aids in properly aligning the magazine 10 for insertion. Two bosses 20 formed on two parallel edges of the depression 26 are similar in shape to the keying cutouts 16 on the cover 12. When the cover 12 is properly oriented in relation to the depression 26, the bosses 20 will nestle into the keying cutouts 16 and permit the cover 12 to be placed into the depression 26. FIG. 4 best illustrates the magazine 10 after initial insertion into the depression 26.

Two grooves 38 are provided above the slide receiving station 50, more fully described in copending application Ser. No. 860,384, filed Sept. 23, 1969, to receive and surround the flanges 18, 18 when the storage chamber 14 is slid rightwardly into position over the receiving station 50 as shown in FIG. 3. As shown therein, the slides 32 are gravitationally urged into the receiving station 50 and thence will be transported individually by a drive plate 34, also set forth in detail in copending application Ser. No. 860,384. Note in FIG. 5 that two cutouts 40 in edge 52 (FIGS. 2 and 3) accommodate the keying projections 30.

After the slides 32 have been cycled through the projector a loading platform (not shown) is utilized in returning the slides to the storage chamber. That apparatus is set out in detail in copending application Ser. No. 860,384. The keying projections 30 also serve to release the loading platform from detent means by wiping across its upper surface when the storage chamber 14, now reloaded with slides, is slid leftwardly so that it may be removed from the projector housing 28. The projector may then receive a second magazine 10 with different slides contained therein.

Quite obviously, the compactness of the slide magazine, provides for convenient storage and handling by the operator. The generally cubic or parallelpipedic shape permits easy stacking of several magazines and keeps the packing factor near maximum.

Thus a novel slide container has been described that provides for convenient storage of photographic slides and which is adapted for positive insertion into and withdrawal from a slide projector.

It should be understood, of course, that the foregoing disclosure relates to only a preferred embodiment of the invention and that many modifications or alterations may be made therein without departing from the spirit and the scope of the invention as set forth in the appended claims.

Having thus described the invention, what is claimed is:

1. A photographic slide magazine comprising:
 a box of substantially parallelepipedic shape having a closed end, four sidewalls and an open end;
 a pair of outwardly protruding flanges disposed on first and second opposing sidewalls at said open end, said flanges lying in a common plane;
 a cover including means for receiving said flanges and being slideable along said flanges for closing and completely exposing said open end; and
 at least one projection extending from a third sidewall beyond said plane.

2. The magazine set forth in claim 1 wherein said cover includes a keying cutout on each of two opposed parallel edges that are displaced from the midpoint of said edges.

3. A photographic slide magazine comprising:
 a box of parallelepipedic shape capable of storing a plurality of photographic slides, said box including four sidewalls, a bottom wall and an open end;
 a pair of flanges that project outwardly from the tops of two opposing parallel sidewalls;
 a pair of posts that project outwardly from the tops of said two sidewalls at their intersection with a third sidewall, said posts having a height greater than said flanges and being spaced from said flanges;
 a captive cover including internal grooves along two opposed parallel edges for receiving said flanges to permit sliding movement parallel to said grooves to open and close said box and for preventing removal of said cover by movement in any other direction;
 a rim that projects downwardly from a third edge of said cover for preventing removal of said cover when it is slid in a closing direction by abutting said third sidewall; and
 a constriction in said grooves at the fourth edge of said cover for permitting passage of said flanges and abutting said posts to prevent removal of said cover when it is slid in the opening direction, whereby the cover is captive with the box and said space between the posts and the flanges permits downward rotation of said cover when it is at the limit of movement in the opening direction to allow complete access to said open end of said box.

4. The slide magazine set forth in claim 3 wherein said captive cover includes a keying cutout on each of said two opposed parallel edges that are displaced from the midpoint of said edges.

5. The slide magazine set forth in claim 4 wherein said flanges lie in a common horizontal plane and the fourth sidewall of said box includes at least one projection extending upwardly beyond said horizontal plane.

6. A photographic slide magazine comprising:
 a box of substantially parallelepipedic shape for containing a supply of slides, said box having a closed end, four sidewalls and an open end;
 a pair of outwardly protruding flanges disposed on first and second opposing sidewalls at said open end, said flanges lying in a common plane for receiving a slideable cover and for insertion into a slide projector to orient said supply of slides in said plane;
 a cover having internal grooves along two opposing edges of said cover for receiving said flanges said cover being slideable along said flanges for closing and completely exposing said open end; and
 at least one projection extending from a third sidewall beyond said horizontal plane for releasing a loading platform in said projector from detent means as said box is removed from said projector.

7. A photographic slide magazine comprising:
 a box of substantially parallelepipedic shape having a closed end, four sidewalls and an open end;
 a pair of outwardly protruding flanges disposed on first and second opposing sidewalls at said open end, said flanges being in a common plane; and
 a cover including means for receiving said flanges and being slideable along said flanges, said cover further including a keying cutout on each of two opposing edges, said cutouts being displaced from the midpoint of said edges.

8. A photographic slide magazine for use in a slide projector comprising:
 a box of substantially parallelepipedic shape for containing a supply of slides, said box having a closed end, four sidewalls and an open end;
 a pair of outwardly protruding flanges disposed on opposing sidewalls at said open end, said flanges lying in a common plane for receiving a slideable cover and for insertion into said slide projector to orient said supply in said plane;
 a cover having internal grooves along two opposing edges of said cover for receiving said flanges and having a keying cutout on each of said opposing edges that are displaced from the midpoint of said edges for cooperating with a pair of bosses formed in said projector to insure that said magazine is properly inserted in said projector.

* * * * *